(12) United States Patent
Hemzal et al.

(10) Patent No.: US 6,597,666 B1
(45) Date of Patent: Jul. 22, 2003

(54) METHOD, EDITOR, COMPUTER, CONTROL MODULE, AND STORAGE MEANS FOR EDITING CONFIGURATION DATA FOR TELECOMMUNICATIONS SYSTEMS

(75) Inventors: Georg Hemzal, Berlin (DE); Michael Foth, Berlin (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/447,299

(22) Filed: Nov. 23, 1999

(30) Foreign Application Priority Data

Nov. 27, 1998 (DE) .......................... 198 54 754

(51) Int. Cl.⁷ ............................................. H04L 12/28
(52) U.S. Cl. ................ 370/254; 370/252; 370/257; 709/220; 710/19; 711/155; 711/206
(58) Field of Search ................... 370/395.7, 395.71, 370/395.72, 494, 495, 254; 709/220, 226, 208, 212; 710/104, 19; 711/155, 206

(56) References Cited

U.S. PATENT DOCUMENTS

| | | | | |
|---|---|---|---|---|
| 5,381,403 A | * | 1/1995 | Maher et al. ................ 370/254 |
| 5,544,303 A | * | 8/1996 | Maroteaux et al. ......... 345/733 |
| 5,708,798 A | * | 1/1998 | Lynch et al. ..................... 703/1 |
| 5,875,242 A | * | 2/1999 | Glaser et al. .......... 379/201.05 |
| 5,892,950 A | * | 4/1999 | Rigori et al. ................. 717/146 |
| 5,950,011 A | * | 9/1999 | Albrecht et al. ............. 717/167 |
| 5,966,123 A | * | 10/1999 | Kaplan ......................... 345/747 |
| 5,991,534 A | * | 11/1999 | Hamilton et al. ........... 717/111 |
| 6,307,925 B1 | * | 10/2001 | Bailis et al. ................. 379/136 |
| 6,396,511 B1 | * | 5/2002 | Karino ......................... 345/744 |
| 6,434,514 B1 | * | 8/2002 | Chen et al. .................. 702/188 |

FOREIGN PATENT DOCUMENTS

EP 0 678 817 A1 10/1995

* cited by examiner

*Primary Examiner*—Douglas Olms
*Assistant Examiner*—Van Nguyen
(74) *Attorney, Agent, or Firm*—Sughrue Mion, PLLC

(57) ABSTRACT

The present invention relates to a method of editing configuration data (KD) for telecommunications systems in accordance with editing rules (ER1, ER2) as well as to an editor (EM), a computer, a control module, and a storage means for carrying out such a method. First, a set of editing rules (ER2) is determined which contains at least one editing rule for editing configuration data. The editor reads and interprets this set of editing rules. If predefined values for the configuration data are to be edited, the editor reads these values. The editor then edits the configuration data in accordance with the set of editing rules and subsequently outputs the configuration data.

9 Claims, 3 Drawing Sheets

METHOD, EDITOR, COMPUTER, CONTROL MODULE, AND STORAGE MEANS FOR EDITING CONFIGURATION DATA FOR TELECOMMUNICATIONS SYSTEMS

BACKGROUND OF THE INVENTION

This invention relates to a method of editing configuration data for telecommunications systems and to an editor, a computer, a control module, and a storage means for carrying out this method.

Telecommunications systems, such as switching centers, access systems, crossconnects, network management systems, computer networks, etc., are generally adapted to specific requirements, which are determined by the respective field of application, by means of configuration data selectable within certain limits. Based on such preselected configuration data, control software contained in a telecommunications system can control the telecommunications system in the respective field of application. System configuration options to be specified for a present-day digital switching center, for example, are, among other things, the subscriber terminals to be served by the switching center, the respective numbers assigned to these subscriber terminals, and the telecommunications services that are made available to the respective subscriber terminals. The configuration data of such a subscriber terminal must comply with predefined rules. A number of a subscriber terminal, for example, may contain only numeric characters and no letter characters, and must consist of a predetermined number of numeric characters. Furthermore, it is generally possible to assign a telecommunications service to a subscriber terminal only if the number of the latter belongs to a group of numbers assigned to the respective telecommunications service. For example, services defined for an ISDN telecommunications network (Integrated Services Digital Network) can be provided to the full extent only for an ISDN-capable terminal station. To permit even large amounts of complex configuration data to be edited, i.e., to be displayed for modification, in a convenient manner, use is advantageously made of a specific, computer-executable editor suited for the respective configuration data, mostly in a graphical operating environment, such as Microsoft Windows or X-Windows. On the one hand, such an editor displays configuration data, which are generally present in the form of numerous interrelated tables, in a clearly arranged and convenient manner. On the other hand, the editor also permits inputs relating to the configuration data, namely both new inputs and additions or changes to existing inputs.

Advantageously, the editor checks the inputs. For example, if a data field is provided for a telephone number, the editor will permit an entry in the data field only if this entry contains exclusively numeric characters. The format of the display of configuration data is usually preprogrammed in such an editor. The editor generally forms part of a configuration system. Besides the editor, such a configuration system includes a so-called validation program module, with which the configuration data are checked for validity and consistency after the editing process.

A typical example of a configuration system is presented in European Patent Application EP 0 678 817 A1. There, configuration data are captured by a computer with the aid of a graphical user interface and then subjected to a consistency check, i.e., a validation, by means of a program module. Only then are the configuration data written into a data base and subsequently processed into a state in which they can be loaded into a telecommunications system referred to as a "target system". Both the graphical user interface and the program module for editing the configuration data and the validation rules contained in the validation program module are—as is customary —provided and programmed specifically for the configuration data to be captured, the user interface and the program module being designed in the programming language "Omnis 7". Such a "fixed"—programmed editor and a likewise "fixed"— programmed associated validation program module are optimized and suited only for the generation of configuration data for a particular target system, so that a specific configuration system must be created for each target system or for each type of target system.

If the requirements to be met by the configuration data change, e.g., because new control software of a telecommunications system requires configuration data of a different form or to a different extent or because new data types for configuring new service features are additionally contained in configuration data, a new editor suitable for the new configuration data must be created or an existing editor must reprogrammed, at least in part, and subsequently compiled. On the one hand, the creation of a new editor is time-consuming and possible only with programming tools. On the other hand, errors can easily occur during such reprogramming, which must be detected by testing the new or modified editor and subsequently be corrected.

SUMMARY OF THE INVENTION

It is an object of the invention to edit configuration data for a telecommunications system in an efficient manner according to editing rules suitable for the respective telecommunications system to be configured with the configuration data.

This object is attained by a method of editing, configuration data as performance parameters for telecommunications systems by means of an editor in accordance with editing rules, comprising the steps of: determining a set of editing rules comprising at least one editing rule for editing the configuration data; reading the set of editing rules; interpreting the set of editing rules; reading predefined values for the configuration data; editing the configuration data in accordance with the set of editing rules; and outputting the configuration data.

According to a further aspect of the invention, there is provided an editor which comprises: a functional determination unit designed to enable the editor to determine a set of editing rules comprising at least one editing rule for editing the configuration data; a functional read unit designed to enable the editor to read the set of editing rules; a functional interpretation unit designed to enable the editor to interpret the set of editing rules; a functional read unit designed to enable the editor to read predefined values for the configuration data; a functional editing unit designed to enable the editor to edit the configuration data in accordance with the set of editing rules, and a functional output unit designed to enable the editor to output the configuration data.

According to a further aspect of the invention, there is provided a computer for editing configuration data as performance parameters of telecommunications systems in accordance with editing rules, the computer comprising: determination means designed to enable the computer to determine a set of editing rules comprising at least one editing rule for editing the configuration data; read means designed to enable the computer to read the set of editing rules; interpretation means designed to enable the computer to interpret the set of editing rules; read means designed to enable the computer to read predefined values for the configuration data; editing means designed to enable the computer to edit the configuration data in accordance with the set of editing rules, and output means designed to enable the computer to output the configuration data.

In accordance with a yet further aspect of the invention there is provided a control module, particularly a compact disk, a floppy disk, or the like, on which an editor is stored for carrying out the above-described method, and a storage means for storing the editor and for use in carrying out the inventive method in conjunction with a processor.

Further advantageous aspects of the invention are apparent from the description and claims below.

The idea underlying the invention is to design an editor, a program module executable on a computer, in such a way that prior to the editing proper, the editor determines editing rules that are necessary to edit configuration data of a telecommunications system and are stored as different sets of editing rules. The editor then reads a set of editing rules so determined from a memory and edits the configuration data in accordance with the editing rules contained in the set of editing rules. Thus, according to the invention, the editing rules are not contained in the editor itself but are read in anew depending on the configuration data to be checked, and interpreted by the editor. The editing rules comprise, for example, rules for displaying the configuration data, so-called formatting rules, rules defining the relationships between constituents of the configuration data, and rules for checking user inputs. According to an advantageous aspect of the invention, the editor determines rules for checking user inputs from a set of validation rules that contains rules to be used by a validation module for validating configuration data. The respective set of editing rules to be used by the editor may be defined in control data that are read and interpreted by the editor. The editor may also determine the respective set of editing rules by means of an identifier contained in the configuration data to be edited.

BRIEF DESCRIPTION OF TH DRAWINGS

The invention and its advantages will become more apparent by reference to the following description of an embodiment taken in conjunction with the accompanying drawings, in which.

DETAILED DESCRIPTION OF THE INVENTION

Figure 1:
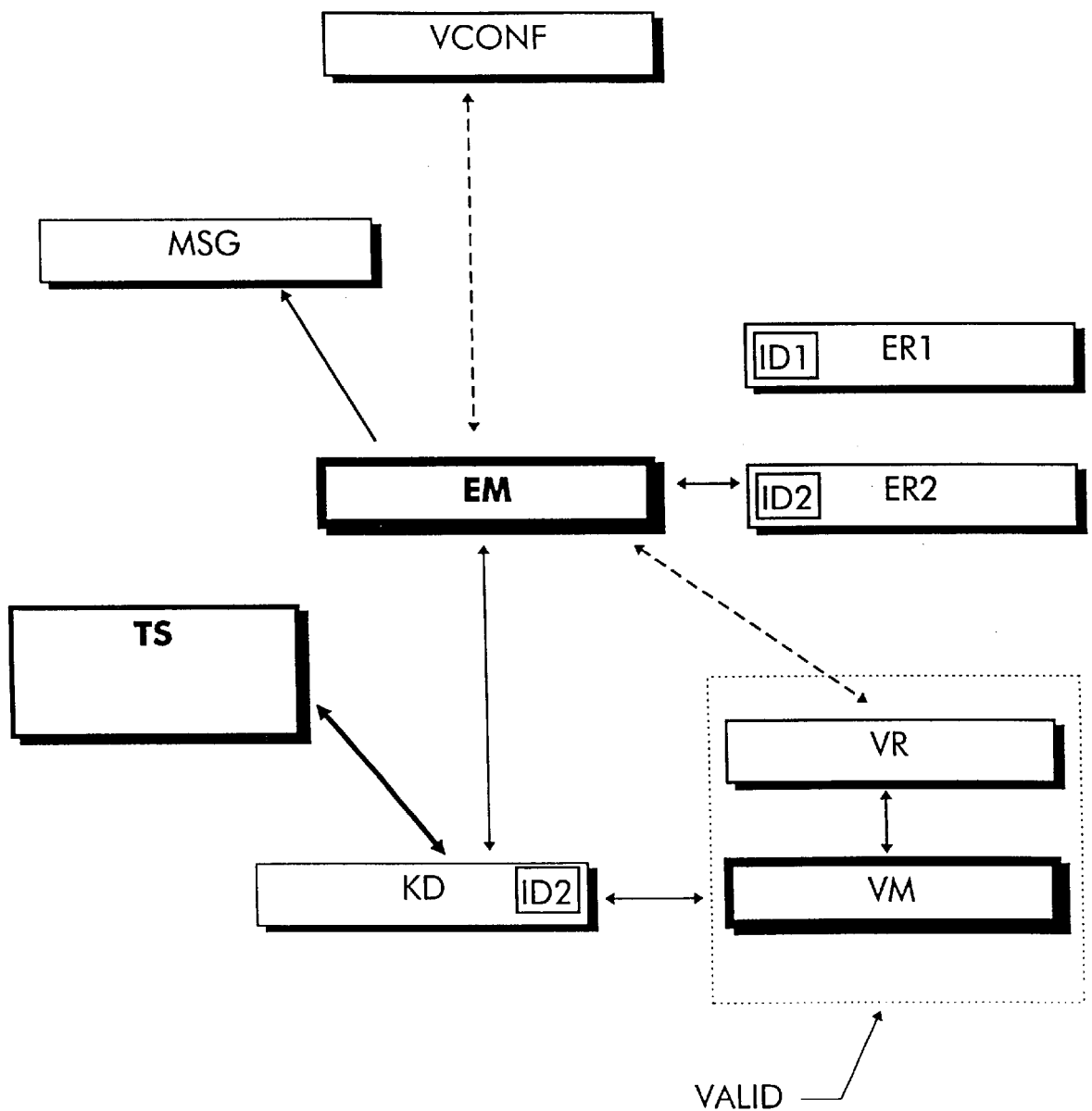
FIG. 1 shows a highly schematic example of an arrangement for carrying out the method according to the invention with an editor (EM) according to the invention, sets of editing rules (ER1, ER2), configuration data (KD) to be edited, a message (MSG), a validation module (VM), and a set of validation rules (VR)

FIG. 1 shows a highly schematic example of an arrangement for carrying out the method according to the invention. The arrangement comprises an editor EM according to the invention, which is executable as a program module on a computer and can edit configuration data universally for different kinds of telecommunications systems. In FIG. 1, such configuration data are shown schematically as configuration data KD.

Figure 3:
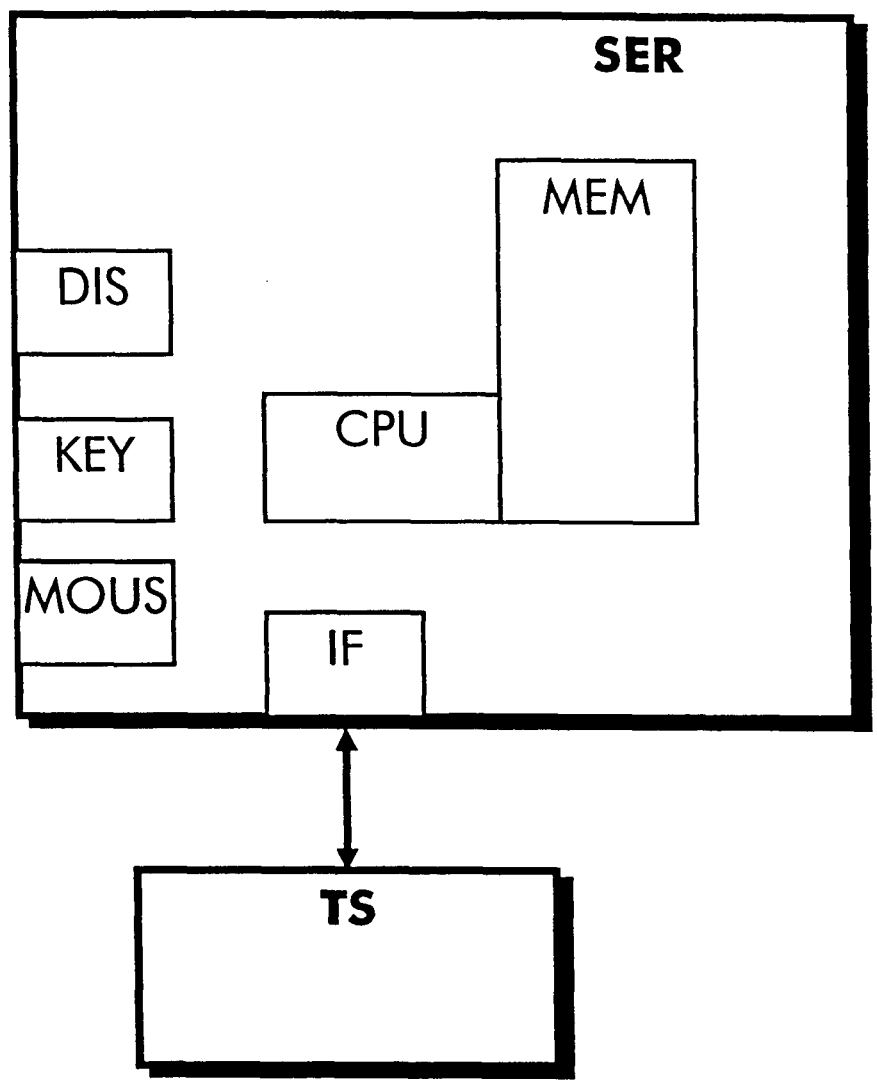
FIG. 3 shows a computer (SER) according to the invention for carrying out the method according to the invention.

A few essential components of a computer, e.g., a personal computer or a workstation, for executing the editor EM are shown in FIG. 3 as a server SER. The server SER includes a control means CPU, e.g., a processor, for executing machine-readable instructions, e.g., instructions for executing the editor EM. Furthermore, the computer SER comprises a memory MEM in which the editor EM can be stored. The computer SER has input means in the form of a keyboard KEY and a so-called mouse MOUS for entering data into the editor EM, for example. On a display device DIS, e.g., a screen, the computer SER can present data that are generated by the editor EM, for example. Via an interface device IF, data can be exchanged with a telecommunications system referred to herein as a "target system TS". The components of the computer SER are interconnected, the connections being not shown in FIG. 3. An operating system, e.g., UNIX or DOS (Disk Operating System), manages the resources of the computer SER and controls, among other things, the execution of the editor EM. The invention will be further represented by reverting to FIG. 1, reference being also made to components of the server SER shown in FIG. 3.

The editor EM can edit the configuration data KD according to one or more editing rules contained in a set of editing rules. Examples of such sets of editing rules are shown in FIG. 1 in the form of a set of editing rules ER1 and a set of editing rules ER2. The sets of editing rules ER1 and ER2 exemplify further sets of editing rules (not shown in FIG. 1) and are stored in the memory MEM. The configuration data KD are suitable for the configuration of the target system TS of FIG. 1, which may for instance be a switching center or a network management system. The configuration data KD contain, for example, data about connections that can be switched by the target system TS, or data that define subscriber terminals served by the target system TS. The target system TS may also be a telecontrol tributary station, for example. In that case, the configuration data KD contain, for example, measured data and instructions that the tributary station is to capture and output, respectively. With the editor EM, the configuration data KD can be both generated and only modified. The editor EM can take so-called default values for the generation of the configuration data KD from one of the sets of editing rules ER1 or ER2. If the configuration data KD are only to be modified by the editor EM, the editor EM can be instructed, e.g., via the keyboard KEY, to load such predefined configuration data KD from the memory MEM or receive them from the target system TS. To this end, the target system TS sends the configuration data KD to the editor EM via a connecting line, for example, and the interface device IF. The output of the configuration data KD by the editor EM and the loading of predefined configuration data KD into the editor EM are indicated by a bidirectional arrow.

To edit the configuration data KD, the editor EM determines the editing rules according to which the configuration data KD have to be checked. To do this, the editor EM uses control data VCONF which specify the set of editing rules in which the necessary editing rules are contained. The control data VCONF may, for instance, be added as so-called call parameters to the editor EM at the start of the latter or be stored in the memory MEM in the form of a control table in which respective assignments of configuration data to a set of editing rules are defined. In such a control table it may be established, for example, that a particular type of target system needs configuration data that have to be edited according to the set of editing rules ER1, while another type of target system needs configuration data that have to be edited according to the set of editing rules ER2. In a variant explained later, the editor EM determines without the help of the control data VCONF which of the sets of editing rules ER1 or ER2 has to be used. In the example of FIG. 1, it is specified in the control data VCONF that the configuration data KD have to be edited in accordance with the set of editing rules ER2. The editor EM reads the set of editing rules ER2 from the memory MEM and edits the configuration data KD in accordance with the set of editing rules ER2. After the editing, the editor EM outputs the configuration data KD, particularly if changes were specified during the editing, for example by storing the configuration data KD in the memory MEM or sending them via the interface device IF to the target system TS. If no changes were made to the configuration data KD, the step of outputting changed configuration data KD may be dispensed with.

The process of editing data at a computer, particularly a computer with a graphical user interface, is known per se. The editing comprises essentially the display and capture of data. In the embodiment of FIG. 1, these functions as well as further functions that will be explained in detail later are provided by the editor EM in accordance with the editing rules of the set of editing rules ER2. According to these editing rules, the editor EM can control a form of display of the configuration data KD on the display device DIS that is suitable for the configuration data KD. With the set of editing rules ER2, it is possible to define, for example, that the configuration data KD have to be displayed in tabular form. The set of editing rules ER2 also defines the format of individual tables, e.g., how many rows and columns a table has and what information is to be contained in the row and column headers of the table. Furthermore, the set of editing rules ER2 may specify in so-called formatting rules how the individual cells of a table are to be formatted, e.g., whether their contents are to be displayed left-aligned or centered, in boldface type or in italics.

However, if—as is usual with complicated target telecommunications systems—the amount of configuration data KD is very large and their constituents have complex relationships to each other, the editor EM may also present the configuration data KD in partial views, e.g., in the form of different tables. The respective optimum partial view of the configuration data KD can be determined by the editor EM according to editing rules of the set of editing rules ER2. For example, if an entry has already been or is yet to be placed into the configuration data KD in one field of each of two tables, i.e., if such an entry is mutually referenced, the editor EM will display the two tables side by side, for example, if a user selects one of the fields with the mous MOUS, for example, or switch between partial views with one of the tables each if the user gives an instruction to do so, e.g. by double-clicking the mouse button on one of the fields.

Beyond the pure capturing and outputting of data, the editor EM also checks user inputs relating to the configuration data KD. To accomplish this, the set of editing rules ER2 contains instructions as to which user inputs are permitted and which are to be rejected by the editor EM. For example, if a field of a table is intended for the entry of a telephone number, and such a number is to consist of six digits, the editor will reject any input that does not meet this requirements. If the user enters any data that does not meet the requirements, the editor EM will indicate this with a message MSG, e.g. in the form of an output at the display device DIS. With the message MSG, the editor EM can indicate the error in detail and also output a help text to the user in which the requirements for correct input are described.

To avoid erroneous user inputs and simplify the user inputs, the editor EM may display to the user a list of possible and permitted input values for an input field, e.g., in the form of selection fields ("pick lists"). The inputs for such lists and the kind and design of their display can be determined by the editor EM from editing rules of the set of editing rules ER2.

If the requirements to be met by the configuration data KD for correct operation of the target system TS have changed, it suffices to replace the set of editing rules ER2 or to modify it in such a way that the editing rules contained in the new or modified set of editing rules ER2 permit editing adapted to the new requirements of the target system TS. The editor EM itself need not be modified. In this way it is also readily possible to insert further editing rules into a set of editing rules or to remove editing rules that are no longer needed from a set of editing rules. If the editor EM is to edit configuration data that can be edited neither with the set of editing rules ER1 nor with the set of editing rules ER2, a new set of editing rules with which the new configuration data can be edited can be added to the sets of editing rules ER1 and ER2 at any time.

In principle, it would be possible that the configuration data already contain editing rules, e.g., formatting rules, at least to a certain extent. Before being loaded into a target system, however, these editing rules would have to be removed from the configuration data in an awkward manner, since the control software of the target system can interpret the configuration data as such, but not the editing rules. A further problem arises with such an approach if configuration data freed of editing rules are loaded from the target system back into an editor for reediting. That is very frequently the case in practice. Then, prior to the loading of configuration data into the editor, editing rules must again be added to the configuration data. By the separation of configuration data and editing rules in accordance with the invention and the dynamic loading of a respective suitable set of editing rules, these problems are avoided in a simple manner.

As mentioned above, the editor EM can check user inputs by means of the set of editing rules ER2. However, it is also possible for the editor EM to determine the rules for checking user inputs from a set of rules that actually serves to validate the configuration data KD. Such a set of rules is shown in FIG. 1 in the form of a set of validation rules VR. The set of validation rules VR exemplifies further sets of validation rules (not shown in FIG. 1) and is determined and read by a validation module VM, a program module executable in the computer SER, for each validation. The validation VM then interprets the validation rules within a validation of the configuration data KD. The assignment of the set of validation rules VR to the validation module VM is indicated by an arrow. The validation module VM and the set of validation rules VR together form a validation system VALID, which can check configuration data captured both by the editor EM and by another data capture system (not shown in FIG. 1). If the configuration data checked by the validation module VM, in FIG. 1 the configuration data KD, have stood the check, e.g., if they are consistent, they can be loaded into the system and used by the latter as performance parameters.

Using the control data VCONF and based on information contained in the set of editing rules ER2, the editor EM can determine, for example, that it must use the set of validation rules VR to edit the configuration data KD. The editor EM then reads the set of validation rules VR and interprets at least part of the validation rules contained therein. As a rule, the editor EM will not interpret all of the validation rules contained in such a set of validation rules, since a set of validation rules is generally provided for an extensive validation of configuration data taking into account numerous interrelationships between data fields. Validation rules defined for a validation of individual data fields, so-called A-rules, and so-called B-rules, defining relations between data fields, are particularly suited for interpretation by the editor EM. Based on such validation rules, the editor EM can check user inputs and permit only user inputs that comply with these validation rules. The editor EM may also perform more detailed checks of user inputs by means of corresponding validation rules of the set of validation rules VR. In such more detailed checks, so-called C-rules are interpreted, which define the relations between data fields of different records of a table, as well as "D-rules", which also define relations between data fields of different tables. In a further variant of the invention, the validation rules, instead of being contained in the separate set of validation rules VR, may be contained, in whole or in part, in the set of editing rules ER2, so that the editor EM has all necessary validation rules available through the set of editing rules ER2.

Because of the above-described reading and interpretation of validation rules defined by the validation module VM for a validation of the configuration data KD, the validation rules which the configuration data KD must comply with need to be generated only once and in a language interpretable by both the editor EM and the validation module VM, not separately for the editor EM and the validation module VM. This reduces the expenditure of work and avoids an error-prone double definition of validation rules and of editing rules performing respective similar functions. In addition, the editor EM can check already during the input of new or modified configuration data KD whether the new inputs can stand a subsequent validation by the validation module VM.

If the sets of editing rules ER1 or ER2 contain predefined information, e.g., text elements, for the message MSG, the editor EM can use this information to format the message MSG. For example, the sets of editing rules ER1 or ER2 may define for each of the editing rules contained therein which error message must be displayed by the editor EM if an error is detected in a check according to the respective editing rule. Since the predefined information for the message MSG does not form part of the editor EM but can be read from a set of editing rules, this predefined information, like the editing rules, can be easily replaced or modified to meet current requirements. In this way, a text for an error message newly inserted into a set of editing rules may, for instance, specify a cause of an error.

The editing rules contained in the sets of editing rules ER1 and ER2 must conform to syntactic and semantic rules determined by the design of the editor EM, i.e., they must be expressed in a given language. Such a language can be defined specifically for the editor EM. An instruction to display a data field of the configuration data KD, i.e., to "format" the data field, may, for example, read: "Field: left-aligned". An entry into this data field will then be displayed by the editor EM left-aligned. Further editing rules for formatting the configuration data KD can thus be easily defined, for example the size of the display of a data field, the number of data fields in a row of a table, etc.

If editing rules going beyond editing rules defining a format are to be defined, use is advantageously made of an interpretive language, whose instructions can be "interpreted", i.e., evaluated, and converted into machine-readable instructions by the editor EM. These instructions can then be executed by the control means CPU in a similar manner as the instruction sequences of the editor EM. Using an interpretive language, it is also possible to define in the sets of editing rules ER1 and ER2 functional units with larger instruction sequences, so-called macros, whose instructions can be executed by the control means CPU under control of the editor EM during the editing of the configuration data KD. If an entry in the configuration data KD occurs identically at different points, e.g., in different tables, and a modification is to be made, this entry not only must be changed at one of these points but must be modified identically at all these points. The editor EM may either itself provide all these points with an identical entry or instruct a macro provided for this purpose in the editing rules of the set of editing rules ER2 to do so.

Advantageously, a universally applicable interpretive language is used for the editing rules. One example of a universal interpretive language is the language PERL (Practicel Extraction and Report Language), which is used in connection with the UNIX operating system. If the editing rules are expressed in PERL, the editor EM need not necessarily interpret the editing rules itself but may charge a program module called "PERL interpreter" with the interpretation of the editing rules. A PERL interpreter usually forms part of a UNIX operating system as supplied. The machine-readable instructions derived from the editing rules by the PERL interpreter are incorporated by the editor EM into its own instruction sequences, e.g., in the form of branches.

This process of incorporating editing rules into the editor EM is particularly simple if both the editor EM and the editing rules to be incorporated are expressed in the same interpretive language. The editor EM then may include a general call referring to an editing rule that bears a name specified in the call. The call, however, refers either to an editing rule in the set of editing rules ER1 or to an editing rule in the set of editing rules ER2, depending on which of the sets of editing rules ER1 or ER2 must be used for validation. The two editing rules bear the same name but may contain different check specifications. In that case, correct branching of the instruction sequences of the editor EM into the instruction sequences generated by interpretation of the sets of editing rules is ensured by the interpreter module.

The editing rules may also be contained in the sets of editing rules ER1 and ER2 in a form executable by a processor, namely as so-called functions, also called "library functions". The editor EM can incorporate the instruction sequences of such functions directly into its own instruction sequences without previous interpretation. Such a process is also referred to as "dynamic linking". In a further variant of the invention, such functions may also be generated during the run time of the editor EM. To accomplish this, the editor EM translates the set of editing rules to be used for editing the configuration data KD into instruction sequences executable by a processor, or has this done by a translator module, and incorporates the validation rule instruction sequences thus generated into its own instruction sequences.

The remarks made in the above sections about the editing rules apply analogously to the validation rules of the set of validation rules VR. The set of validation rules VR may also be expressed in an interpretive language and contain functional units, both in the form of macros and in the form of executable program functions.

In addition or alternatively to the determination of a set of editing rules by means of control data, it is possible for the editor EM to determine by means of the configuration data KD which of the sets of editing rules ER1 or ER2 is needed to check the configuration data KD. To do this, the editor EM searches the configuration data KD for a feature or an identifier that uniquely identifies the configuration data KD. Such an identifier is contained in the configuration data KD in the form of an identifier ID2. The identifier ID2 may identify the configuration data KD as belonging to a particular target system, and may be a text element containing the information: "Switching center A with control software version 1.3". Based on assignments of respective ones of such identifiers to each of the sets of editing rules, which may be contained in an assignment table, for example, the editor EM can then determine which set of editing rules is to be used to edit the configuration data KD. It is also possible for the editor EM to determine the set of editing rules ER1 or ER2 necessary to edit the configuration data KD by means of an identifier that must be identical to that contained in the configuration data KD. In the example of FIG. 1, the identifier ID2 of the configuration data KD is also given in the set of editing rules ER2; by contrast, the set of editing rules ER1 has an identifier ID1.

If no identifier is contained in the configuration data KD, e.g., because such an identifier would interfere with the processing of the configuration data KD, the editor EM may also determine the set of editing rules to be used for the check based on the structure and type of the configuration data KD. If—in a very simple example—the configuration data KD contain only records that each begin with a number string, the editor EM can, for instance, derive therefrom that the configuration data KD have to be edited in accordance with the set of editing rules ER1. If, however, the configuration data KD contain only records that each begin with a letter string, the editor EM can derive therefrom that the configuration data KD have to be edited in accordance with the set of editing rules ER2.

Figure 2:
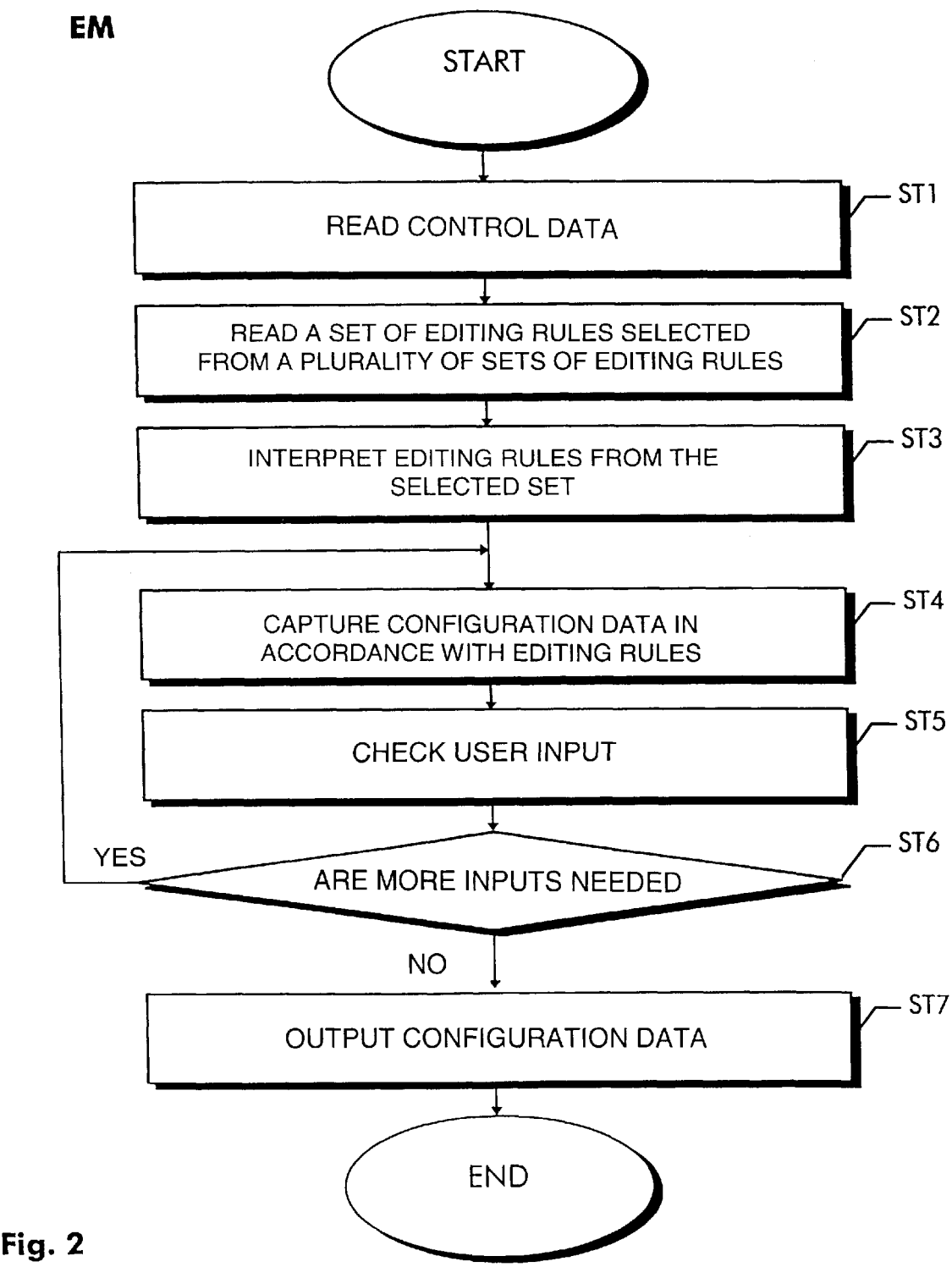
FIG. 2 is a flowchart of an editor (EM) according to the invention.

FIG. 2 shows the essential steps of the editor EM. The editor EM, as mentioned, consists of instruction sequences stored in a memory that are readable or directly executable by a control means, e.g., a processor, or indirectly interpretable with the aid of an interpreter module. The editor EM may, for instance, be expressed in the programming language "Java", which was originally developed for Internet applications, and for whose interpretation a suitable interpreter module is meanwhile incorporated in nearly every operating system. For an easy understanding of the representation, the validation module VM is shown in FIG. 3 in the form of a flowchart. Each of the individual steps stands for a single instruction or a sequence of instructions that form a functional unit, a so-called function. The number of steps in FIG. 3 and their sequence are to be considered exemplary for a solution that meets practical requirements. It is also possible to perform the steps in an order different from that shown in FIG. 2. The editor EM is executable by the computer SER of FIG. 3, for example.

Starting from a start field START, at step ST1, the editor EM determines, e.g., by means of the control data VCONF mentioned in connection with FIG. 1, the set of editing rules according to which it is to edit the configuration data. The instructions of step ST1, e.g., the reading of the control data VCONF and their interpretation, are combined in a functional determination unit, e.g., in a subprogram. At step ST2, the editor EM reads the determined set of editing rules, and at step ST3, it interprets first editing rules contained in this set and, using these editing rules, formats, for example, a display on the display device DIS. At step ST4, the editor EM captures configuration data that are entered, e.g., as user inputs, through the keyboard KEY. It is also possible that at step ST4, the editor EM first reads modifying configuration data that are already being used by a telecommunications system. At step ST5, these configuration data are displayed by the editor EM in accordance with the editing rules. At step ST5, the editor EM may also check a user input to the configuration data in accordance with an editing rule read at step ST2. At step ST6, a test is made to determine whether the editor, after completion of step ST5, is to output the configuration data or capture further user inputs. If further user inputs are to be made, a branch is made back to step ST4; otherwise, at step ST7, the editor EM outputs configuration data, e.g., stores these data in the memory MEM, for example, or sends the configuration data via the interface device to a telecommunications system to be configured with the configuration data if it is instructed to do so. The editor EM then ends in a step END.

What is claimed is:

1. A method of editing configuration data as performance parameters of telecommunications systems by means of an editor the method comprising:

selecting a set of editing rules from a plurality of sets of editing rules, the selected set of editing rules comprising at least one editing rule for editing the configuration data;

reading the selected set of editing rules;

interpreting the selected set of editing rules;

reading predefined values for the configuration data;

editing the configuration data in accordance with the selected set of editing rules; and outputting the edited configuration data.

2. A method as claimed in claim 1, wherein the editor (EM) selects the selected set of editing rules for editing the configuration data (KD), wherein the editor interprets the set of editing rules, and wherein the editor edits the configuration data in accordance with the set of editing rules.

3. A method as claimed in claim 1, wherein the editor selects the set of editing rules based on control data (VCONF) destined for the editor.

4. A method as claimed in claim 1, wherein the interpretation of the selected set of editing rules comprises determining and reading functional units with which the configuration data can be edited in accordance with the editing rules contained in selected the set of editing rules, and wherein the functional units are used to edit the configuration data.

5. A method as claimed in claim 1, wherein the set of editing rules is selected by means of an identifier contained in the configuration data.

6. An editor (EM) for editing configuration data as performance parameters of telecommunications systems in accordance with a plurality of sets of editing rules, comprising:

a functional determination unit designed to enable the editor to determine a set of editing rules comprising at least one editing rule for editing the configuration data;

a functional read unit designed to enable the editor to read the set of editing rules;

a functional interpretation unit designed to enable the editor to interpret the set of editing rules;

a functional read unit designed to enable the editor to read predefined values for the configuration data;

a functional editing unit designed to enable the editor to edit the configuration data in accordance with the set of editing rules; and a functional output unit designed to enable the editor to outputting the edited configuration data.

7. A computer for editing configuration data as performance parameters of telecommunications systems in accordance with a plurality of sets of editing rules comprising;

determination means designed to enable the computer to determine a set of editing rules comprising at least one editing rule for editing the configuration data;

read means designed to enable the computer to read the set of editing rules;

interpretation means designed to enable the computer to interpret the set of editing rules;

read means designed to enable the computer to read predefined values for the configuration data;

editing means designed to enable the computer to edit the configuration data in accordance with the set of editing rules; and output means (IF) designed to enable the computer to outputting the edited configuration data.

8. A computer program product, including computer readable media, said media comprising instructions to enable a computer to implement a method for editing configuration data as performance parameters of telecommunications systems by means of an editor the instructions including instructions for:

selecting a set of editing rules from a plurality of sets of editing rules, the selected set of editing rules comprising at least one editing rule for editing the configuration data;

reading the selected set of editing rules;

interpreting the selected set of editing rules;

reading predefined values for the configuration data;

editing the configuration data in accordance with the selected set of editing rules; and outputting the edited configuration data.

9. A computer program product, including computer readable media, said media comprising instructions to enable a computer to implement an editor for editing configuration data as performance parameters of telecommunications, the instructions including instructions for:

determination means designed to enable the computer to determine a set of editing rules comprising at least one editing rule for editing the configuration data;

read means designed to enable the computer to read the set of editing rules;

interpretation means designed to enable the computer to interpret the set of editing rules;

read means designed to enable the computer to read predefined values for the configuration data;

editing means designed to enable the computer to edit the configuration data in accordance with the set of editing rules; and output means designed to enable the computer to outputting the edited configuration data.

* * * * *